United States Patent
Michiwaki (10) Patent No.: US 12,367,002 B2
(45) Date of Patent: Jul. 22, 2025

(54) INDIVIDUAL IDENTIFICATION SYSTEM

(71) Applicant: NejiLaw Inc., Tokyo (JP)

(72) Inventor: Hiroshi Michiwaki, Tokyo (JP)

(73) Assignee: NejiLaw Inc., Tokyo (JP)

( * ) Notice: Subject to any disclaimer, the term of this patent is extended or adjusted under 35 U.S.C. 154(b) by 543 days.

(21) Appl. No.: 17/779,466

(22) PCT Filed: Nov. 20, 2020

(86) PCT No.: PCT/JP2020/043520
§ 371 (c)(1),
(2) Date: Nov. 21, 2022

(87) PCT Pub. No.: WO2021/106812
PCT Pub. Date: Jun. 3, 2021

(65) Prior Publication Data
US 2023/0139082 A1    May 4, 2023

(30) Foreign Application Priority Data
Nov. 25, 2019    (JP) .................. 2019-211996

(51) Int. Cl.
*G06F 3/00* (2006.01)
*G01L 1/22* (2006.01)
*G06F 3/14* (2006.01)
*G06V 20/20* (2022.01)

(52) U.S. Cl.
CPC .................. *G06F 3/14* (2013.01); *G01L 1/22* (2013.01); *G06V 20/20* (2022.01)

(58) Field of Classification Search
None
See application file for complete search history.

(56) References Cited

U.S. PATENT DOCUMENTS

| 2010/0219235 A1* | 9/2010 | Nemet | G06Q 10/08 235/375 |
| 2010/0327051 A1* | 12/2010 | Lyon | G06K 19/06028 235/375 |
| 2018/0307045 A1* | 10/2018 | Nishi | G02B 27/017 |

FOREIGN PATENT DOCUMENTS

| JP | 2002032784 A * | 1/2002 | ............... G06F 3/00 |
| JP | 2014-235704 A | 12/2014 | |
| JP | 2015-081798 A | 4/2015 | |
| JP | 2015-176516 A | 10/2015 | |

(Continued)

OTHER PUBLICATIONS

Decision to Grant a Patent for Japanese Application No. 2019-211996, dated Aug. 20, 2024, 2 pages with English translation.

(Continued)

*Primary Examiner* — Martin Mushambo
(74) *Attorney, Agent, or Firm* — TraskBritt (57) ABSTRACT

An identification system has one or more sensing devices each having an identifier, and an individual identification apparatus for performing individual identification of the devices. The devices are each provided with a visual confirmation part that can be visually confirmed from the outside. The individual identification apparatus is provided with an image identification means capable of identifying the visual confirmation parts of the devices as image information. The display content of the visual confirmation parts is read by the image identification means to acquire the identifiers.

18 Claims, 10 Drawing Sheets

(56) References Cited

FOREIGN PATENT DOCUMENTS

| JP | 2015-207219 A | | 11/2015 | | |
|---|---|---|---|---|---|
| JP | 2015215642 A | * | 12/2015 | ............ | G06F 3/048 |
| JP | 2018-181232 A | | 11/2018 | | |
| JP | 2019-095889 A | | 6/2019 | | |

OTHER PUBLICATIONS

Japanese Notice of Reasons for Refusal for Japanese Application No. 2019-211996, dated Jan. 23, 2024, 10 pages with English translation.

Japanese Notice of Reasons for Refusal for Japanese Application No. 2019-211996, dated Jun. 4, 2024, 6 pages with English translation.

International Search Report for International Application No. PCT/JP2020/043520, mailed Feb. 16, 2021, 7 pages with English Translation.

International Written Opinion for International Application No. PCT/JP2020/043520, mailed Feb. 16, 2021, 8 pages with Machine English Translation.

* cited by examiner

INDIVIDUAL IDENTIFICATION SYSTEM

CROSS-REFERENCE TO RELATED APPLICATIONS

This application is a national phase entry under 35 U.S.C. § 371 of International Patent Application PCT/JP2020/043520, filed Nov. 20, 2020, designating the United States of America and published as International Patent Publication WO 2021/106812 A1 on Jun. 3, 2021, which claims the benefit under Article 8 of the Patent Cooperation Treaty to Japanese Patent Application Serial No. 2019-211996, filed Nov. 25, 2019.

TECHNICAL FIELD

The following description relates to an individual identification system.

BACKGROUND

Currently, various tools exists such as a building and a construction (an architecture and a construction are collectively referred to as a construction) such as residential houses, apartment houses, buildings, bridges, steel towers, railways, pipelines, plants, power plants, wind power generators, and solar power generation equipment, members used for the construction (building materials, structural materials, etc.), industrial machines such as construction machines and machinery equipment, other mechanical devices, parts composing the same, fastening members (screws, studs, rivets, nails, etc.), blades, various means of transportation (rockets, aircraft, submarines, ships, trains, buses, trucks, passenger cars, motorcycles, bicycles, elevators, etc.), office and household equipment and daily necessities, and play equipment that children use. Such structures (constructions, mechanical devices, vehicles, or the like, are collectively referred to as a structure), members used for them, mechanical devices, parts composing them, fastening members, blades, etc., various moving means, various tools (hereinafter referred to as member, etc.) are assumed to be used over a long period of time, but deterioration is inevitable due to being exposed to an external force by an impact such as earthquake disasters and the like or aging degradation. If the deterioration is unattended, natural or man-made disasters may occur.

Further, according to a related art, an axial force measurement method for identifying the fastening state of a bolt as a fastening member has been known (for example, referring to Patent Document 1), and the axial force of the bolt is calculated by measuring for the amount of depression with respect to a bolt including a central portion of the head of the bolt depressed by the axial force at the time of fastening.

Patent Document 1: Japanese Patent Application Laid-Open Publication No. 2015-081798

BRIEF SUMMARY

However, since the axial force measurement method described in Patent Document 1 described above calculates the axial force by measuring the physical change of the outer shape, the amount of change (deformation) must be measured every time the axial force is measured, and there is an issue in that calculating the axial force takes a lot of effort and the convenience is bad. Further, in such the axial force measurement method, there is an issue in that measurement and axial force calculation are required to be performed in a close state, and the axial force cannot be known remotely.

This disclosure has been made by the inventor's diligent studies in view of the above issues, immediately acquires information reflecting the physical state of members and the like and/or surroundings with a simple and easy structure, and aims to provide means for displaying the acquired information to be visually recognizable.

According to an aspect, there is provided an individual identification system including at least one sensing device including an identifier, and an individual identification apparatus configured to perform individual identification of the device, wherein the device includes a visible portion visually recognizable from the outside, the individual identification apparatus includes an image identification means operable to identify the visible portion of the device as image information, and display content of the visible portion is read and the identifier is acquired by the image identification means.

In addition, the individual identification system of this disclosure is characterized in that the visible portion is still image information configured by including at least one of a character, a symbol, a geometric pattern, a color image, a character image, a bar code, a two-dimensional bar code, and a color bar code.

In addition, the individual identification system of this disclosure is characterized in that the visible portion is configured to include a light emitting means.

In addition, the individual identification system of this disclosure is characterized in that the display content of the visible portion changes with time.

In addition, the individual identification system of this disclosure is characterized in that the device includes a receiver configured to receive a signal from the outside.

In addition, the individual identification system of this disclosure is characterized in that the visible portion is configured such that unique display content is visually recognizable after receiving the signal from the outside.

In addition, the individual identification system of this disclosure is characterized in that the light emitting means is capable of emitting one or more of infrared rays, visible rays, and ultraviolet rays.

In addition, the individual identification system of this disclosure is characterized in that the visible portion has unique display linked with the identifier.

In addition, the individual identification system of this disclosure is characterized in that the individual identification apparatus is cooperated with an image output portion, and the individual identification apparatus displays and outputs acquisition information of the device according to the identifier identified by the image identification means as extended reality to the image output portion.

In addition, the individual identification system of this disclosure is characterized in that the device includes an information acquirer configured to acquire information reflecting a physical state of the device and/or the device's surroundings, and a transmitter configured to transmit the information reflecting the physical state acquired by the information acquirer to the outside.

In addition, the individual identification system of this disclosure is characterized by further including a server configured to receive the information reflecting the physical state from the device and store the information, wherein the server is configured to transmit the stored information reflecting the physical state to the individual identification apparatus in response to a request from the individual identification apparatus.

According to this disclosure, it is possible to instantly acquire information reflecting a physical state of a member or the like and/or surroundings and display the acquired information so to be visually recognizable with a simple and easy structure.

DETAILED DESCRIPTION

Figure 1:
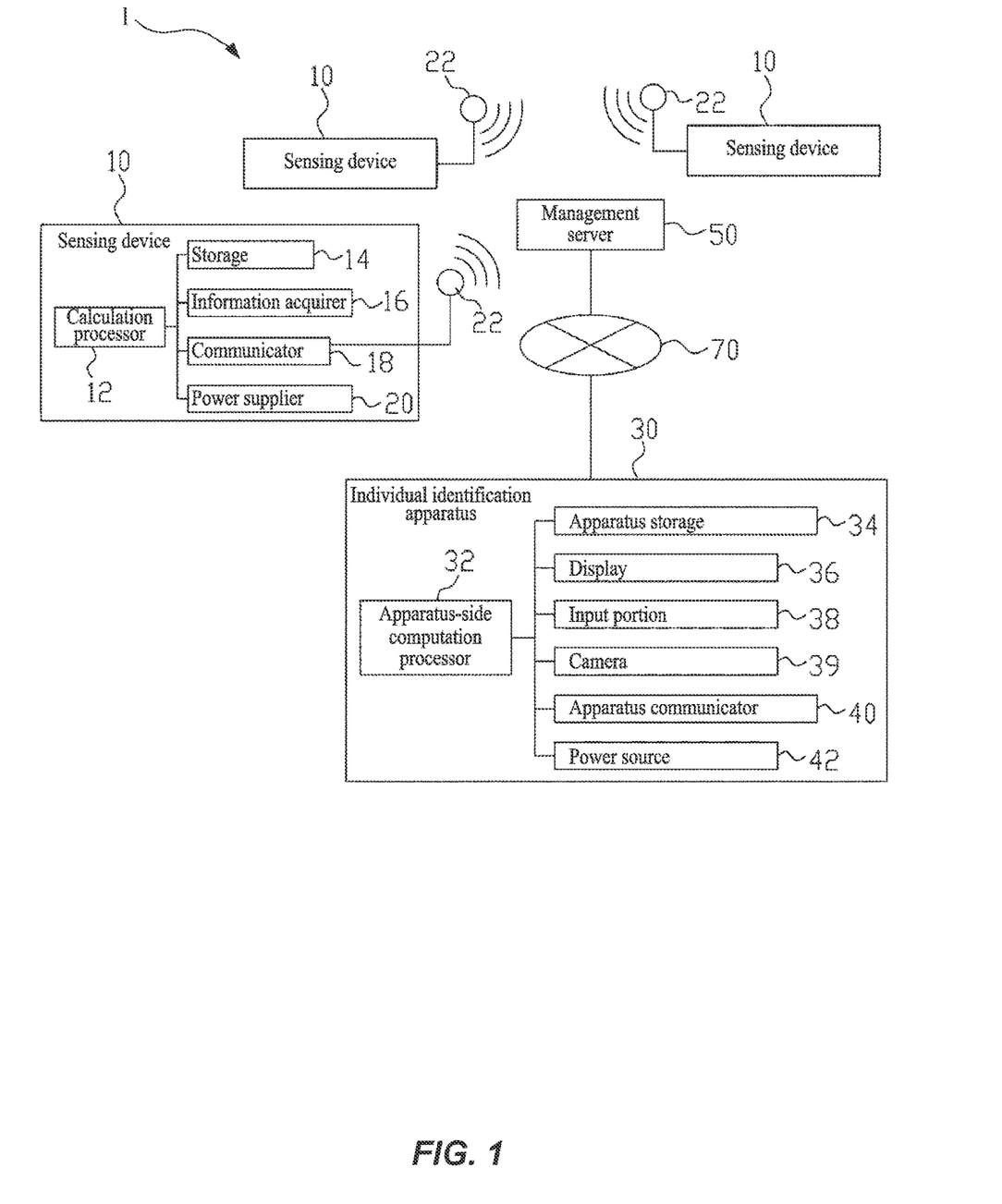
FIG. 1 is a block diagram illustrating an individual identification system according to an example embodiment.

Example embodiments of an individual identification system of this disclosure are described below with reference to drawings. FIG. 1 is a block diagram illustrating an individual identification system 1 according to an example embodiment. The individual identification system 1 of this disclosure measures information about physical changes as information reflecting a physical state of a member that is a target of measurement, and the like, and/or the member's surroundings, and makes the information about the physical changes visually recognizable.

The individual identification system 1 includes a sensing device 10 capable of measuring information reflecting the physical state, an individual identification apparatus 30 that displays the information reflecting the physical state measured by the sensing device 10 in an augmented reality environment, and a management server 50 that manages the information reflecting the physical state measured by the sensing device 10.

As Information output from the sensing device 10 is managed by the management server 50 and transmitted from the management server 50 to the individual identification apparatus 30 simultaneously, the information is displayed to be visually recognizable to the user. Of course, it may be set to transmit information directly from the sensing device 10 to the individual identification apparatus 30, and in that case, the management server 50 may be configured to record and manage information received from the sensing device 10.

The sensing device 10 includes a computation processor 12 that collectively controls each component. The computation processor 12 is connected to a storage 14, an information acquirer 16, a communicator 18, and a power supplier 20. The storage 14 is a so-called memory, and stores an identifier (ID) indexed for each sensing device (for each member and the like) and a control program by the computation processor 12, and the like. In addition, the storage 14 may store setting information in an initial state of the sensing device 10 and the like, and may be configured to be capable of storing calculation results processed by the computation processor 12 and the like.

The information acquirer 16 is configured to have a strain measurement sensor (a strain gauge and/or a pattern for strain measurement), an A/D converter, and the like, and acquires the information reflecting the physical state applied to the member on which the sensing device 10 is mounted. Here, as information reflecting the physical state, the amount of change in the physical state with respect to the initial state (a predetermined state) of the member or the like, in other words, an amount of change in strain with respect to the strain measured at the initial stage of installation is acquired.

In addition, the information acquirer 16 may acquire posture information or temperature information as information reflecting the physical state by including sensors other than the strain measurement sensor, for example, a gyro sensor for measuring posture (inclination, orientation), an orientation sensor, a temperature sensor for measuring temperature, and the like. Moreover, when the strain measurement sensor and the temperature sensor are used together, the influence of the strain by temperature among the strain measured by the strain measurement sensor may be excluded. In other words, the strain in which the influence by temperature is excluded may be acquired by performing the correction process based on the temperature measured by the temperature sensor with respect to the strain measured by the strain measurement sensor.

The correction processing may be executed by circuit correction in the information acquirer 16 or by computation processing in the computation processor 12, or may be executed by both the information acquirer 16 and the computation processor 12. In addition to the above sensors, the information acquirer 16 may include, for example, an acceleration sensor, a pressure sensor, an odor sensor, a specific particle sensory sensor, a radiation sensor, a humidity sensor, a position sensor (GPS), a human detection sensor, and an optical sensor, a sound sensor, a magnetic sensor, a current sensor, a voltage sensor, a rotation angle sensor, an image sensor, or the like.

The communicator 18 transmits, via the antenna 22, information reflecting the physical state acquired by the information acquirer 16 to the management server 50. Of course, the communicator 18 may simply transmit a signal to the outside, and may transmit information by generating transmitting waves such as radio waves, light, and sound using a light emitter (a light emitting element), a speaker, or the like, in addition to the antenna 22, as a transmitting means. Further, the communicator 18 may include a receiver, for example, overlap a response signal with the transmitted wave, and receive information according to an instruction of the response signal from the outside through the receiver. In addition, the communicator 18 may transmit the information on the physical changes to the management server 50 through a network 70 described later.

The power supplier 20 supplies power to each unit from a power supply source (not shown). In addition, the power supply source may be a battery (primary battery or secondary battery) or an external power supply (AC power supply or DC power supply). Further, the power supplier 20 may receive a power supply wave form the outside and transmit the power to each component by including a power receiving means. In addition, the power receiving means may employ one or more various structures, and be possible to provide a plurality of them in parallel, but receive the power supply wave and convert the power supply wave into electric power by ,for example, an energy conversion element such as a coil, an antenna, a light receiver(a photonic element, a solar panel, and the like), an energy conversion element such as a vibrator and the like configured to convert vibration, pressure change, and the like, into electric energy, such as microphone or piezoelectric element.

In addition, as another method of supplying power, for example, a so-called Seebeck element (circuit), which uses a sound wave as a power supply wave and obtains an electromotive force by using the Seebeck effect as a power receiving means, may be used. In this case, using the switching of the high-density medium region and the low-density medium region alternately created in the medium by the sound pressure of the sound wave of an appropriate frequency used as the power supply wave, positioning a first contact and a second contact of the Seebeck element in each region generated alternately, respectively, and at a timing when the high-density medium region surrounds the first contact, the first contact becomes a hot-contact, while at this moment, the second contact becomes a cold contact by being surrounded by the low-density medium region so that an electromotive force in a predetermined direction is generated. When the high-density medium region and the low-density medium region are exchanged, an alternating current in which the direction of the current of electromotive force due to temperature difference is switched is obtained. In addition, by arranging a sound resource as a power supply device at two other points in the space, an overlapping sound field of sound waves may be created, and as a result a normal electromotive force may be generated in the Seebeck element by setting a state in which there is a normal density difference (roughness difference) between the first contact point and the second contact point of the Seebeck element. As a method of setting a sound resource as a power supply device at two or more suitable points on such a space, for example, a power receiving means may be located in the middle of two power supply devices, these two power supply devices and the power receiving means may be arranged in a straight line, and a power supply wave from each power supply device may be generated toward the power receiving means. By setting it as such a configuration, the electric power supply wave of the power receiving means becomes a standing wave such that a normal temperature difference may be created in a predetermined portion, and a direct current may be generated.

Moreover, the power receiving means is not limited to the case of receiving the power supply wave generated from the power supply device, and the power receiving means may receive the power supply wave naturally generated by the surrounding environmental change and convert it into electric power. The surrounding environmental change includes, for example, vibration, temperature change, external light (illuminated light or natural light), pressure change (air pressure change), external force change (wind, buoyancy change, rainfall), and the like. A combination of natural environmental change and power supply device may be used.

The individual identification apparatus 30 is a display device mounted on a user's head, such as a head mounted display and smart glasses (wearable computer), and includes an apparatus-side computation processor 32 for comprehensively controlling each component. An apparatus storage 34, a display 36, an input portion 38, a camera 39, an apparatus communicator 40, and a power source 42 for supplying power to each component are connected to the apparatus-side computation processor 32.

The apparatus storage 34 stores the calculation result and the like by the apparatus-side computation processor 32 in addition to various processing programs executed by the individual identification apparatus 30, such as a detection processing program for detecting the sensing device 10, an operation accepting program through the input portion 38, or a table for storing in linked with a identifier identifying the sensing device 10 and a marker 150, which will be described later.

Figure 2:
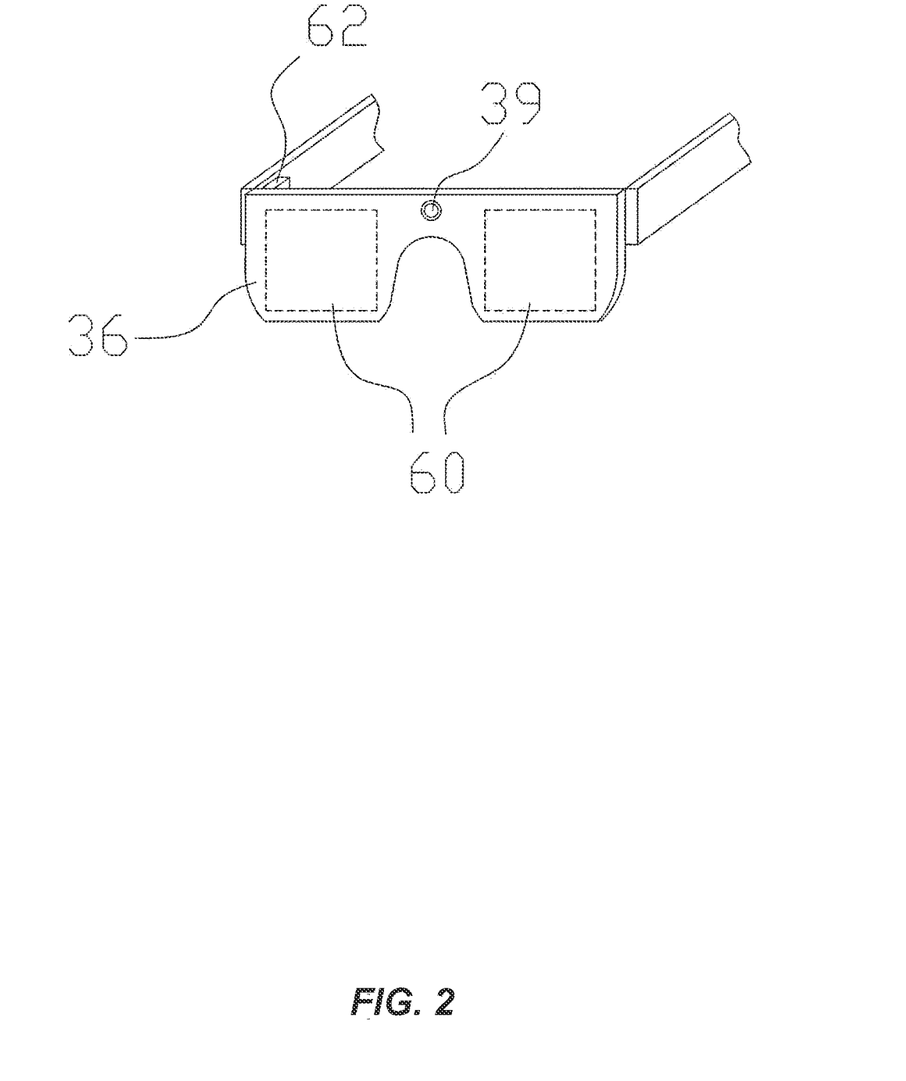
FIG. 2 is a diagram illustrating an individual identification apparatus according to an example embodiment.

The display 36 is an optical transmission type display that displays an image that a user can visually recognize, and makes it possible to visually recognize the scenery in a user's field of view. Specifically, the display 36 includes a light guide lens 60 formed of a resin or glass that transmits visible light as shown in FIG. 2, and an image projector 62 for projecting an image into the light guide lens 60. Although the installation position of the image projector 62 is not specifically limited, as shown in FIG. 2, the image projector 62 may be installed in a temple portion and the like of the individual identification apparatus 30.

The light guide lens 60 may be disposed in front of the user's eyes when the individual identification apparatus 30 is mounted. In addition, a half mirror is disposed inside the light guide lens 60, and visible light output from the image projector 62 (an image output portion) is reflected by the half mirror to reach the user's eyes, and the visible light from the outside view passes through the half mirror and reaches the user's eyes. As a result, by the display 36, the user may visually recognize an image formed by both visible lights in a state in which the visible light from the field of view and the visible light from the image projector 62 are overlapped. In other words, an extended reality image is displayed to the user by projecting the image by the image projector 62.

In addition, the display 36 is not necessarily limited to the above configuration, and may comprise only an image projector that does not have a light guide lens and projects an image directly onto the user's retina. In addition, by setting the display screen to cover the field of view in front of the user's eyes, an image of a scenery in a range corresponding to the field of view of the user being photographed by the camera 39 may be displayed on the display screen.

The input portion 38 includes a power switch, an operation key, a decision key, and the like of the individual identification apparatus 30, and is an input means for operating the individual identification apparatus 30. In addition, the input portion 38 may include a motion detection program that receives an input by a gesture, a gaze detection program that receives an input by a movement or direction of a gaze, or the like.

The camera 39 is a camera capable of taking a moving picture provided with an image pickup device such as a CCD or CMOS, and the angle of view is set so as to cover approximately the entire field of the user's field of view. In addition, the camera 39 is installed so as to face the front in the individual identification apparatus 30. In addition, there may be a plurality of the cameras 39, and if there are two or more cameras, a distance or a three-dimensional space may be recognized more accurately.

An apparatus communicator 40 communicates with the management server 50 via the network 70. In addition, the apparatus communicator 40 may have an antenna for receiving a signal. In other words, a signal transmitted from the sensing device 10 may be received. As the network 70, any wireless communication network such as a wireless wide area network (WWAN), a wireless local area network (WLAN), a wireless personal area network (WPAN), a Wi-Fi network, and the like may be used.

The management server 50 includes a database that stores information reflecting the physical state of each sensing device 10, communicates with the individual identification apparatus 30 via the network 70, and is a sever comprising one or a plurality of components. For example, when the sensing devices 10 are scattered in each place, a plurality of management servers 50 is installed in each place to enter within a communication range of the sensing device 10.

Figure 3:
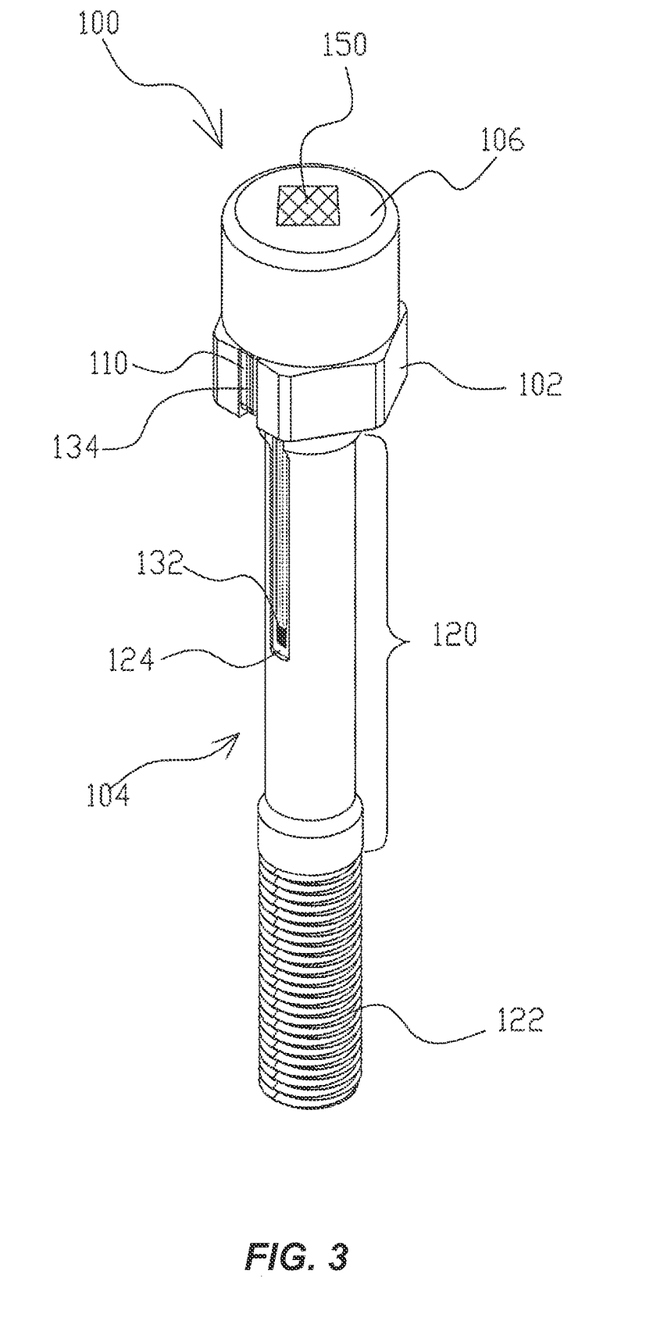
FIG. 3 is a diagram illustrating a deformation detection bolt on which a sensing device according to an example embodiment is mounted.

Here, FIG. 3 is a diagram illustrating a deformation detection bolt 100 as the sensing device 10 of an example embodiment. The deformation detection bolt 100 includes a head portion 102 and a shaft portion 104, and configuration capable of detecting stresses such as bending stress, compressive stress, tensile stress, and strain stress applied to the member itself. In addition, a separate head cap 106 is attached to (fitted to) the head portion 102 in the deformation detection bolt 100. In addition, a deformation detection target is not limited to a bolt.

Further, a circuit board composing each component of the sensing device 10 is installed in the head portion 102 so as to be electrically connected to a terminal 130 (to be described later), and furthermore, is mounted on the deformation detection bolt 100 by mounting the head cap 106. In addition, the installation position of the circuit board (sensing device 10) is not necessarily the head portion 102, for example, may be the front-end portion of the deformation detection bolt 100.

Figure 4:
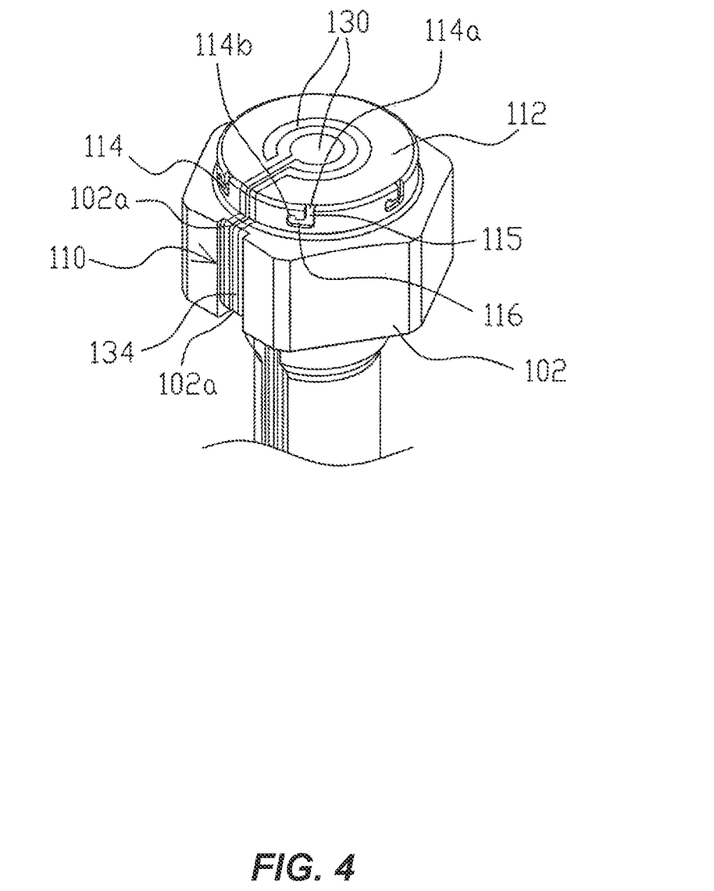
FIG. 4 is a perspective view illustrating a head portion of a deformation detection bolt according to an example embodiment.

FIG. 4 is a perspective view illustrating the head portion 102 of the deformation detection bolt 100 according to an example embodiment. The head portion 102 has an outer periphery of a hexagonal shape, and has three pairs of two-sided widths. In addition, the head portion 102 has an external shape that has a maximum size in an axis perpendicular direction perpendicular to the axis compared to the shaft portion 104, that is, a length (width) in a direction perpendicular to the axis is greater compared to the shaft portion 104. The head portion 102 is continuous over one side and a seat side of the outer peripheral surface, and includes a concave-shaped conduction path installation portion 110. In addition, a fitting portion 112 into which the head cap 106 may be fitted is included in the end.

Figure 5:
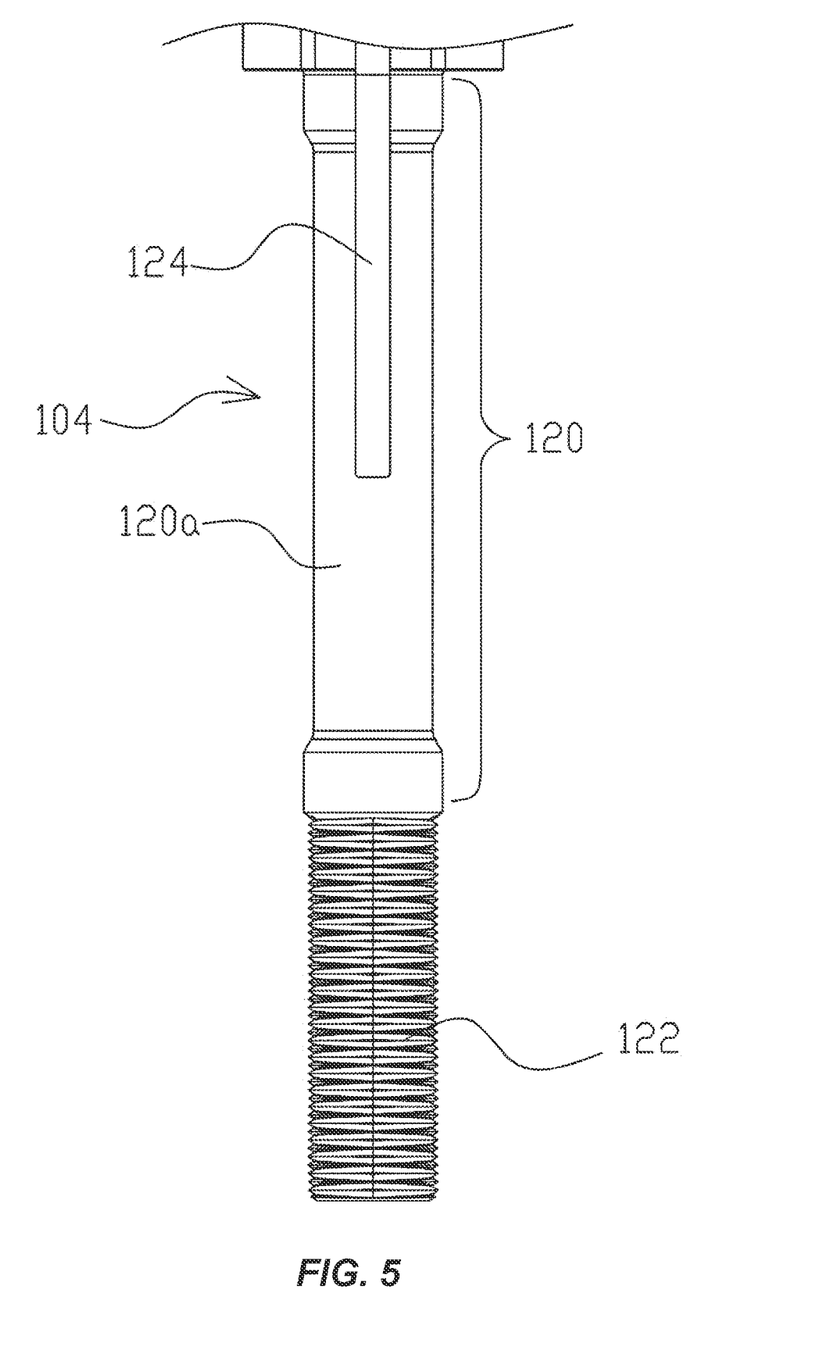
FIG. 5 is a diagram illustrating a shaft portion of a deformation detection bolt according to an example embodiment.

FIG. 5 is a diagram illustrating a shaft portion 104 of the deformation detection bolt 100 of an example embodiment. In addition, the sensor pattern 132 mentioned later is omitted in FIG. 5. The shaft portion 104 has an outer shape that is long in the axial direction compared with the maximum size in the axis perpendicular direction. The shaft portion 104 includes a cylindrical portion 120 disposed on a base side or the seat side of the head portion 102 and a screw portion 122 having a male screw spiral groove formed on an outer peripheral surface. In other words, in the shaft portion 104, the cylindrical portion 120 is located on one end side where the head portion 102 exists, and the screw portion 122 is located on the other end side.

The cylindrical portion 120 has a column-shaped outer periphery shape, and includes a reduced portion 120a whose external shape is reduced so that some regions have curvatures with respect to the whole. The length in the axial perpendicular direction is set for the axial portion 120a to be about the curvature or effective diameter of the external thread of the screw portion 122, and the axial portion 120a is approximately equal to the effective diameter of the external thread in the example embodiment. The cylindrical portion 120 includes a sensor installation portion 124 provided concave with respect to the outer peripheral surface. The sensor installation portion 124 includes a bottom portion having a planar shape, and is installed to extend from the middle portion of the axial portion 120a toward the head portion 102 along the axial direction.

A sensor pattern 132 for constituting a physical change detection means for detecting a physical change of the shaft portion 104 is directly formed on the bottom portion of the sensor installation portion 124. In other words, the sensor pattern 132 may function as a strain measurement sensor connected to the information acquirer 16 of the sensing device 10. In addition, the sensor pattern 132 comprises a conductive material, and comprises a sensor structure portion extending reciprocally in the axial direction a plurality of times, and a lead portion extending from the sensor structure portion toward a side of the head portion 102. Accordingly, in the sensor pattern 132, electrical characteristics such as a resistance value change with the deformation of the conductive material in the sensor structure portion. By detecting a change in the electrical characteristics, the sensor pattern 132 may be used as various sensors for detecting a physical change.

In addition, the physical change detected by the change of the electrical characteristic may be heat/temperature change, a humidity change, and the like. For example, when measuring the environmental temperature from a change in the electrical resistance value of the sensor pattern 132, the sensor pattern 132 means using as a component of a so-called resistance thermometer. Moreover, humidity may be measured similarly with a resistance change type electric humidity sensor. The sensor pattern 132 is electrically connected to the conduction path 134 formed on the side of the head portion 102.

Next, the conduction path installation portion 110 and the fitting portion 112 of the head portion 102 will be described. The conduction path installation portion 110 shown in FIG. 3 includes the bottom portion of the concave shape that cross section is planar shape, and the conduction path 134 is formed directly in the bottom portion. The conduction path installation portion 110 is extended along the axial direction on the outer peripheral surface of the head portion 102, and the extension installation direction is set to extend in a direction perpendicular to the axial direction on the seat side. In addition, if the conduction path installation portion 110 is a series over at least the outer peripheral surface and the seat side of the head portion 102, the extension installation direction may be appropriately set, such as being installed to extend from the outer peripheral surface in a direction inclined with respect to the axial direction. In addition, the depth, width and the like of the conduction path installation portion 110 may be appropriately set.

The fitting portion 112 has a cylindrical shape protruding in the axial direction from the end face (an end portion) of the head portion 102. Moreover, the fitting portion 112 has a plurality of locking grooves (locking portion) 114 on the outer peripheral surface shown in FIG. 4. In addition, the terminal 130 electrically connected to the conduction path 134 is directly formed on the end face of the fitting portion 112.

The locking groove 114 formed on the outer peripheral surface of the fitting portion 112 may be insert into a locking piece 106a (see FIG. 6) of the head cap 106, and has a shape that can restrict the position in the axial direction of the head cap 106, for example, a substantially L-shape.

In this case, the locking groove 114 includes an axial guide portion 115 and a circumferential guide portion 116. The axial guide portion 115 is installed to extend along the axial center from an insertion port 114a, and guides movement of the locking piece 106a in the axial direction. The circumferential guide portion 116 is curved or bent along the circumferential direction with respect to the axial guide portion 115, and has a restriction end portion 114b formed on the terminal side. The restriction end portion 114b is a curved portion extending toward the top surface side of the head portion 102 along the axial direction. When the locking piece 106a is fitted into the restriction end portion 114b, the movement of the locking piece 106a in the axial direction and in the circumferential direction may be restricted.

Figure 6:
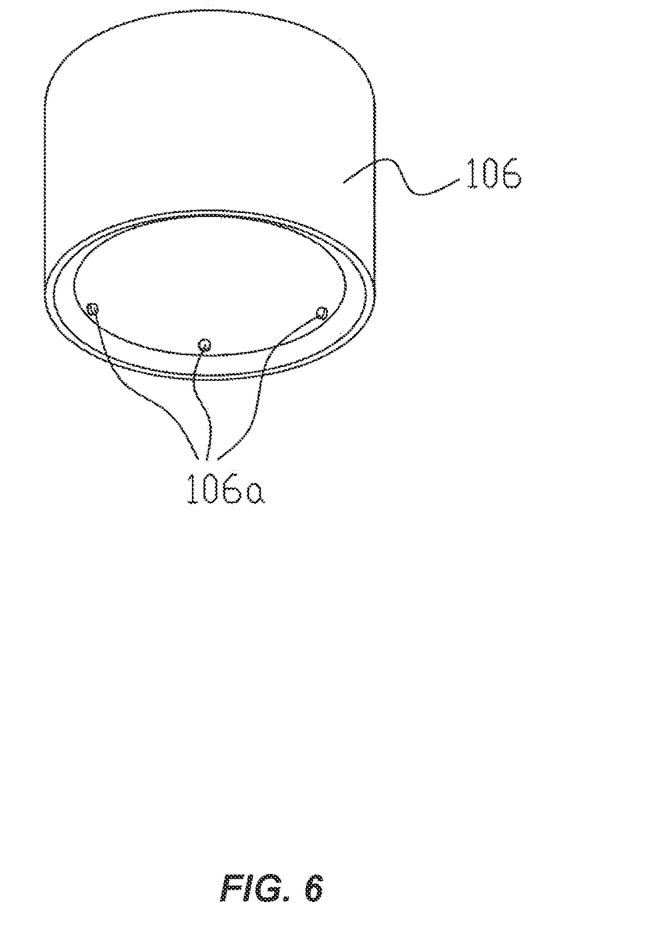
FIG. 6 is a perspective view illustrating a head cap.

FIG. 6 is a perspective view illustrating the head cap 106. The head cap 106 is mounted by being put on the fitting portion 112 of the head portion 102 and includes a plurality of the protrusion-shaped locking pieces 106a on an inner peripheral surface. In addition, it is preferable to dispose an intervening member between the head portion 102 and the head cap 106. Here, the intervening member is a so-called seal member, a packing, or the like, and comprises a flexible material, for example, an elastic body such as rubber, silicone or the like. Of course, the flexible member here is not limited to a resin material, and the flexible member may be thing that can obtain a firm fitting state by being elastically deformed and/or plastically deformed, and not particularly limited.

Moreover, the marker 150 (a visible portion) is installed in the position that can be visually recognized from the outside in the deformation detection bolt 100. Specifically, the marker 150 is installed on the surface of the head portion 102, the head cap 106 or the like so that the marker 150 can be visually recognized from the outside even when the deformation detection bolt 100 is screwed into the tapped hole or the nut. The marker 150 is still image information composed by including any one or more of characters, symbols, geometric shapes, color images, character images, bar codes, two-dimensional bar codes, and color bar codes in addition to so-called AR markers. In addition, the shape of the head portion 102 and/or the head cap 106 may be different for each deformation detection bolt 100, and the external shape of the head portion 102 and/or the head cap 106 itself may be set as the marker 150.

Next, an example of forming the terminal 130, the sensor pattern 132, and the conduction path 134 will be described. First, the terminal 130, the sensor pattern 132, and the conduction path 134 are directly formed on the surface of the deformation detection bolt 100. For example, when the base material of the deformation detection bolt 100 has conductivity, an electrical insulation layer is formed on the surface of the deformation detection bolt 100, and a conductive portion forming the terminal 130, the sensor pattern 132, and a pattern of the conduction path 134 is formed by a material having high conductivity such as a conductive material and the like on the electrical insulation layer.

The electrical insulating layer may be formed using, for example, lamination printing, putt printing, painting, plating, inkjet printing, sputtering, chemical vapor deposition method (CVD method), physical vapor deposition method (PVD method), or the like. Alternatively, another method to be used may be, for example, in a state where a predetermined mask is placed, forming a film by sputtering an insulating material, applying a silica material and heat-treating the applied silica material, or forming a layer comprising an organic insulating material such as polyimide, epoxy, urethane, silicone, fluorine or the like.

When the base material of the deformation detection bolt 100, that is, the head portion 102 or the shaft portion 104 has electrical conductivity, the surface of the base material may be oxidized to form the electrical insulating layer by oxidation treatment. Moreover, when the base material is aluminum-based, the electrical insulation layer may be installed by an alumite treatment. Of course, the electrical insulation layer is not limited to being formed according to such a method. In addition, when the base material of the deformation detection bolt 100 has electrical insulating properties, the conductive portion forming the terminal 130, the sensor pattern 132, and the pattern of the conduction path 134 directly on the base material without forming the electrical insulating layer may be formed.

The conductive portion is directly formed on the electrical insulating layer by lamination printing using a conductive paste, putt printing, painting, plating, inkjet printing, sputtering, CVD method, PVD method, or the like. Moreover, the shape of the wiring may be set by performing masking in accordance with the shape of the terminal 130, the sensor pattern 132, and the conduction path 134 and etching the conductive portion. In this way, the conductive portion does not peel off over a long period of time by forming the conductive portion directly in the electrical insulating layer.

Of course, the terminal 130, the sensor pattern 132, and the conduction path 134 may be formed in series on the deformation detection bolt 100. In that case, processing such as round chamfering in the boundary portion 102a between a parallel plane parallel to the axis existing in the axial direction of the deformation detection bolt 100 and a perpendicular plane substantially perpendicular to the parallel plane, and forming a curved shape are preferable. In this way, a conductive portion may be formed more easily compared with the case forming the conductive portion on the surface in which a parallel plane and a perpendicular plane form an angular shape.

Figure 7:
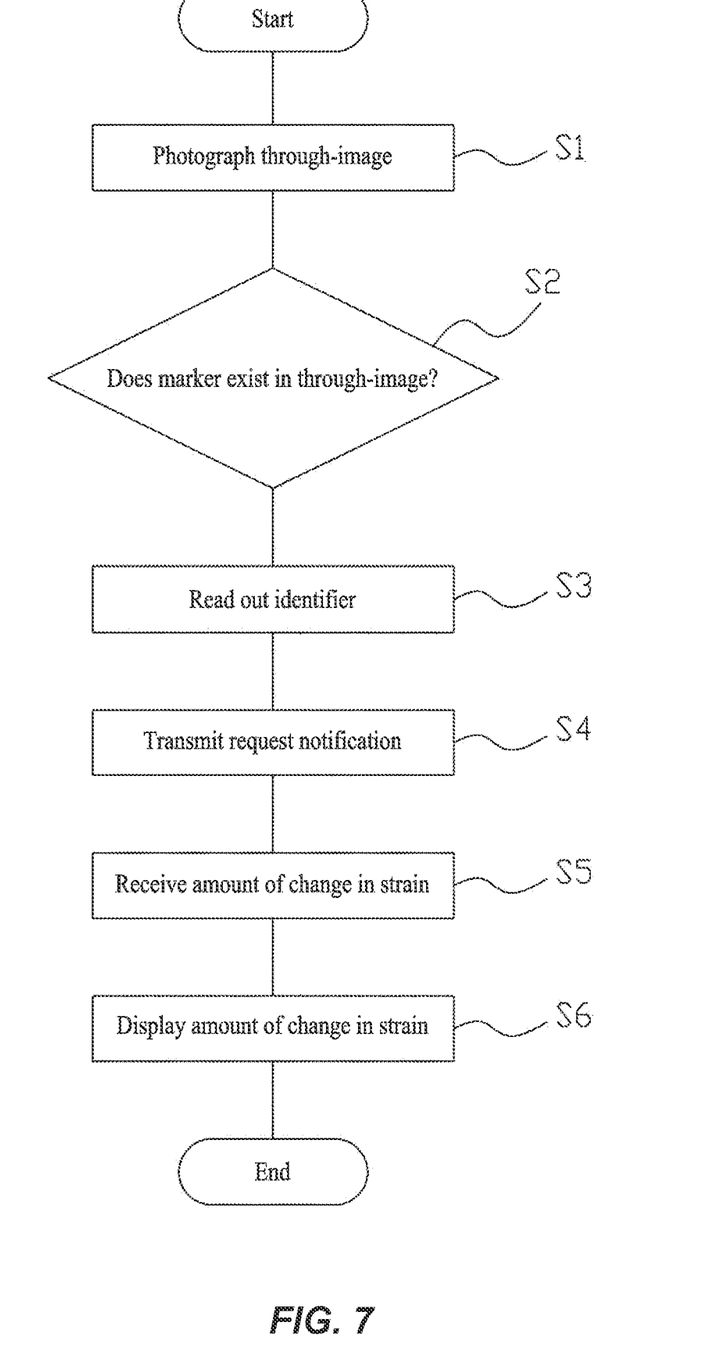
FIG. 7 is a flow chart illustrating a process of acquiring an amount of change in strain by an individual identification system according to an example embodiment.

Next, a process of acquiring an amount of change in strain of the deformation detection bolt 100 by the individual identification system 1 is illustrated. FIG. 7 is a flow chart illustrating a process of acquiring an amount of change in strain by the individual identification system 1 according to an example embodiment. Here, when the deformation detection bolt 100 is viewed through the individual identification apparatus 30 (when the camera 39 is directed toward the deformation detection bolt 100), an amount of change in strain measured by the sensing device 10 is displayed on the display 36 of the individual identification apparatus 30.

First, the apparatus-side computation processor 32 of the individual identification apparatus 30 photographs a through-image by the camera 39 (step S1). The apparatus-side computation processor 32 determines whether or not the marker 150 exists in the through-image (step S2), and when the marker 150 of the deformation detection bolt 100 is not within a photographing range of the camera 39 (step S2, No), through-image photographing is continued.

On the other hand, when the marker 150 exists within the photographing range of the camera 39 (step S2, Yes), the apparatus-side computation processor 32 reads out the identifier cooperated with the marker 150 (step S3). In other words, the apparatus-side computation processor 32 recognizes the marker 150 by image identification, and searches and reads out the identifier linked to the marker 150 by referring to the table of the apparatus storage 34 based on the recognized marker 150.

The apparatus-side computation processor 32 issues the identifier to a request notification for prompting transmission of the amount of change in strain, and transmits the request notification to the management server 50 via the network 70 by the apparatus communicator 40 (step S4). For this reason, the management server 50 searches the database based on the identifier linked to the request notification, and reads out the corresponding amount of change in strain. The management server 50 transmits the read amount of change in strain to the individual identification apparatus 30 via the network 70.

Figure 8A:
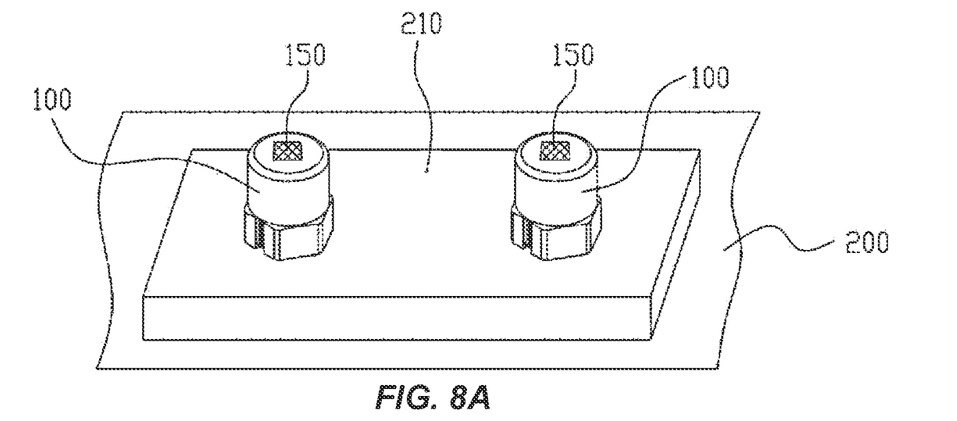
FIGS. 8A and 8B are diagrams illustrating an example of displaying an amount of change in strain of a deformation detection bolt according to an example embodiment.
Figure 8B:
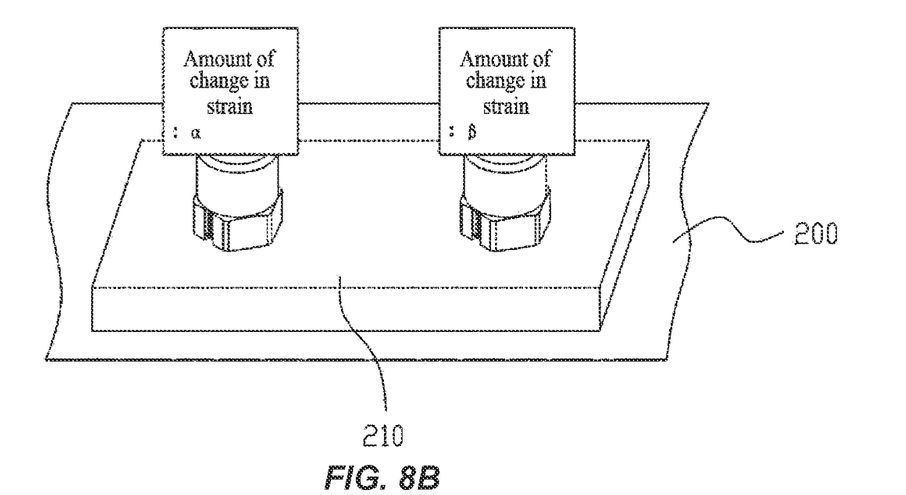

The apparatus-side computation processor 32 receives the amount of change in strain via the network 70 (step S5), displays the received amount of change in strain on the display 36 (step S6), and ends the amount of change in strain acquisition process. For example, when two deformation detection bolts 100 are used for fixing the plate material 210 to the base 200 as shown in FIG. 8A, and when viewing the marker 150 through the individual identification apparatus 30, that is, when facing the individual identification apparatus 30 so that the marker 150 is included in the photographing range of the camera 39, the amount of change in strain is displayed on the display 36. At this time, the apparatus-side computation processor 32 displays the amount of change in strain so as to be overlapped with the marker 150 in the user's field of view as shown in FIG. 8B. Accordingly, the user may visually recognize the deformation detection bolt 100 and the amount of change in strain at the same time.

As described above, by directing the individual identification apparatus 30 toward the marker 150 of the deformation detection bolt 100, the amount of change in strain applying on the deformation detection bolt 100 may be acquired and displayed to the user. In other words, the amount of change in strain in the deformation detection bolt 100 may be acquired immediately, and the acquired amount of change in strain may be displayed to be visually recognizable on the display 36. In addition, since the amount of change in strain is displayed near the marker 150, it is possible to clearly indicate to the user which of the deformation detection bolts 100 the amount of change in strain is.

As long as the marker 150 can be photographed by the camera 39, the amount of change in strain may be known even from a remote location, and the convenience is improved.

In addition, read-out of the identifier is not limited to when the marker 150 exists in the field of view. For example, when a plurality of markers 150 exists within the photographing range (the field of view of the user) by the camera 39, if the display 36 displays each the amount of change in strain of all the markers 150, rather, there is a risk that visibility may deteriorate. Therefore, only the amount of change in strain of the deformation detection bolt 100 (sensing device 10) designated by the user may be displayed. For example, only the identifier of the designated marker 150 by the gesture may be read out. In this case, the apparatus-side computation processor 32 is a program module that realizes the function of detecting the user's gesture with respect to the marker 150. In other words, when the marker 150 and the user's finger (and hand) are recognized from the image acquired through the camera 39, and a gesture of tapping a position on the marker with the finger or hand is made, the apparatus-side computation processor 32 determines that an instruction to acquire the identifier of the marker 150 has been made.

In addition, the identifier of the marker 150 designated by the user's gaze may be read out. In this case, an imager for detecting the gaze is installed in the individual identification apparatus 30 to detect the user's gaze. In other words, the apparatus-side computation processor 32 detects the user's gaze from the image information by the imager for detecting the gaze, specifies which marker 150 the gaze is directed to within the photographing range by the camera 39, and reads out the identifier of the specified marker 150.

Moreover, the apparatus-side computation processor 32 may read out the identifier of the marker 150 designated by the user's voice. In this case, a microphone as a voice input portion is installed in the individual identification apparatus 30 to receive a user's voice input. In other words, the apparatus-side computation processor 32 receives the user's voice input through the microphone and reads out the identifier of the marker 150 specified by the voice.

In addition, the apparatus-side computation processor 32 may read out the identifier of the marker 150 of the deformation detection bolt 100 irradiated with laser. In this case, the apparatus-side computation processor 32 is a program module that realizes the function of detecting the laser irradiation location. In other words, the apparatus-side computation processor 32 detects the laser irradiation location from the image acquired through the camera 39, and reads out the identifier of the marker 150 of the deformation detection bolt 100 to which the laser is irradiated.

In addition, in the above-described example embodiment, the marker 150 is installed in the deformation detection bolt 100, but is not limited thereto. A light emitter including an LED and the like to be controlled by the sensing device 10 and emitting any one or more of infrared rays, visible light rays, and ultraviolet rays may be installed in the deformation detection bolt 100, and the identifier may be notified by light emission of the light emitter. For example, like a Morse signal, the light emitter may be turned on intermittently and a character code indicating the identifier may be sent. In addition, the computation processor 12 intermittently performs transmission processing of the amount of change in strain by the communicator 18, synchronizes emission timing of the light emitter with transmission timing by the communicator 18, and further, directly receives the amount of change in strain with the individual identification apparatus 30. In this way, since only the identifier of the deformation detection bolt 100 that the light emitter emits light is transmitted, confusion with the identifier of the other deformation detection bolt 100 may be prevented.

In addition, the position information may be set for each deformation detection bolt 100 to manage the management server 50 and the position information, and the deformation detection bolt 100 may be detected from the position of the individual identification apparatus 30 and the direction of the camera 39. In this case, the individual identification apparatus 30 is equipped with a GPS, a direction sensor, and the like. The apparatus-side computation processor 32 communicates with, for example, the management server 50, and notifies its own position information and the direction the individual identification apparatus 30 is facing. The management server 50 specifies the deformation detection bolt 100 existing in the vicinity and in front of the individual identification apparatus 30 from the position information and the direction of the individual identification apparatus 30, and transmits the amount of the change in strain to the individual identification apparatus 30. Due to this, the amount of change in strain may be displayed on the display 36 of the individual identification apparatus 30.

Figure 9:
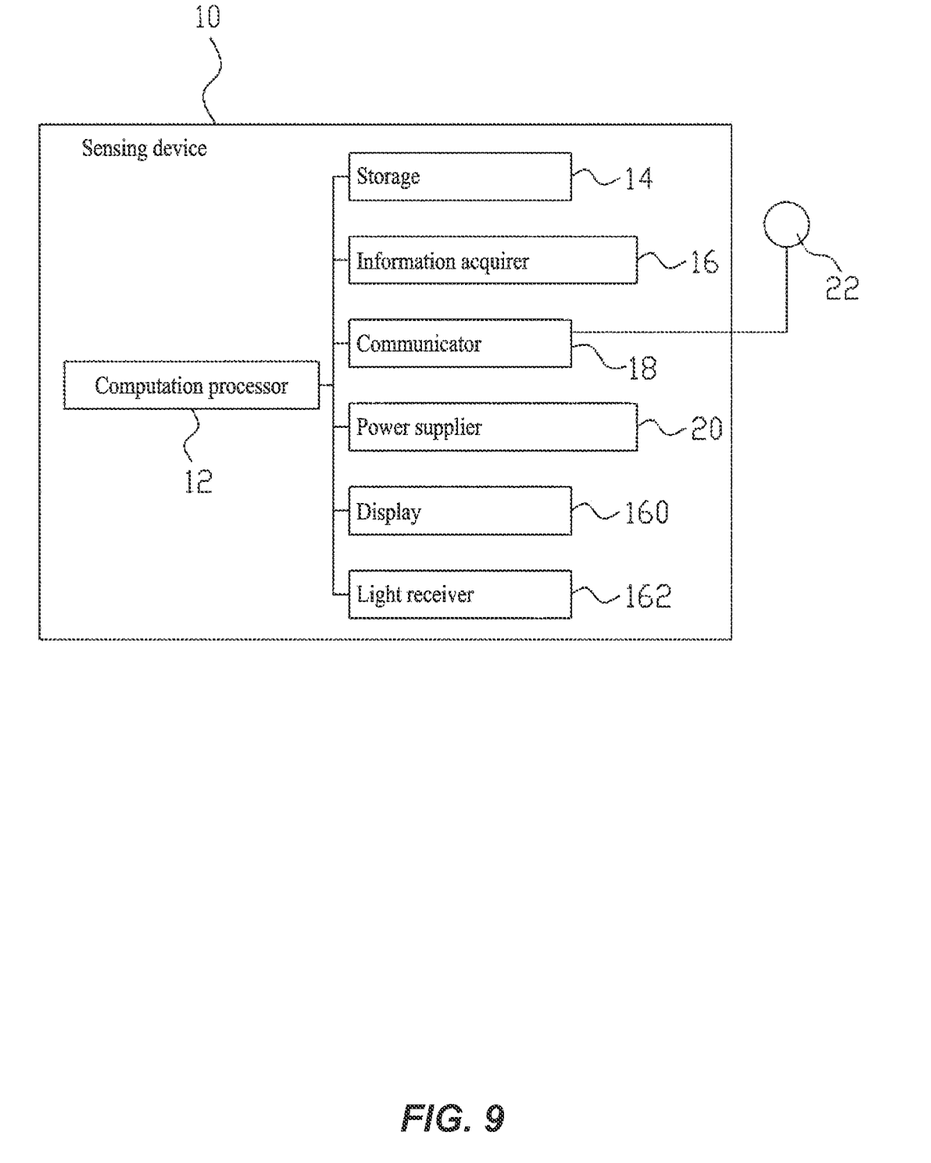
FIG. 9 is a block diagram illustrating another example of the sensing device 10.

FIG. 9 is a block diagram illustrating another example of the sensing device 10. The sensing device 10 is not limited to the configuration described above, and may include a display 160 made of an LED panel or the like, and a receiver 162 for receiving a signal from the outside. Here, the display 160 displays characters, symbols, geometric patterns, color images, character images, bar codes, two-dimensional bar codes, color bar codes, and the like corresponding to the marker. In addition, the signal received by the receiver 162 may use a signal by light, a signal by sound, a radio signal, and the like.

Figure 10A:
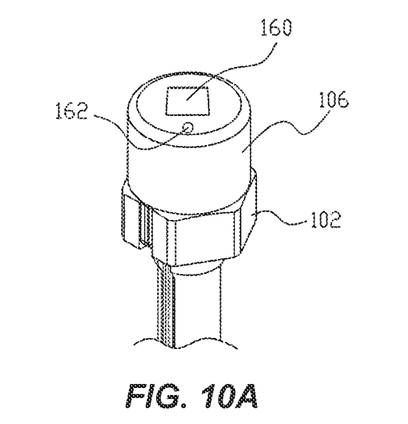
FIGS. 10A-10C are diagrams illustrating positions of a display and a receiver.
Figure 10B:
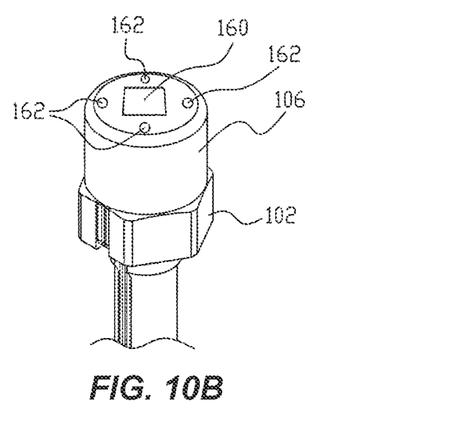
Figure 10C:
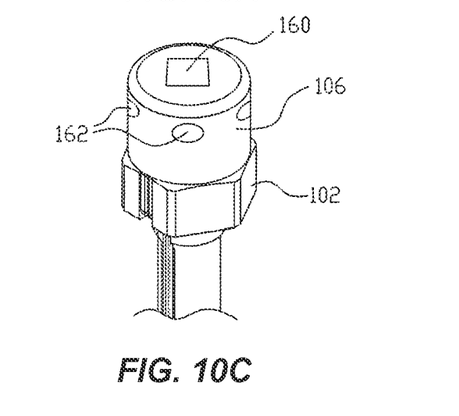

In addition, the display 160 and the receiver 162 may be arranged on the top surface of the head cap 106 of the deformation detection bolt 100 so as to be seen from the outside, for example, as shown in FIG. 10A. In addition, receiver 162 may be a plural, and a plurality of receivers may be arranged around the display 160 at predetermined intervals as shown in FIG. 10B. In addition, the position of the receiver 162 may be set on the outer peripheral surface of the head cap 106 as shown in FIG. 10C.

For example, if the receiver 162 includes a light receiving element for receiving light, when the user irradiates light such as a laser toward the receiver 162, the computation processor 12 recognizes the reception of the signal by the receiver 162 and displays the marker on the display 160. Even with such a configuration, it is possible to acquire a desired identifier of the sensing device 10.

In addition, in the above-described example embodiment, the case of transmitting strain and stress information has been described as an example, but this disclosure is not limited thereto, and various information may be acquired such as acceleration information and posture information that may be acquired by an acceleration sensor or a gyro sensor or the like, pressure information on liquids, gel-like body, gases, solids, and the like acquired by a pressure sensor, information on odors acquired by the odor sensor, information on radiation doses and the like acquired by the radiation sensor, moisture adhesion information acquired by the humidity sensor, the positional information acquired by the position sensor (GPS), and image information acquired by an image sensor and the like. According to the various sensors that the information acquirer 16 of the sensing device 10 may include, the sensing device 10 (and the deformation detection bolt 100 mounted thereon) may acquire various information reflecting the physical state of the sensing device 10 and/or the sensing device's surroundings.

In addition, in the example embodiment described above, the information reflecting the physical state is transmitted from the management server 50 to the individual identification apparatus 30, but is not limited thereto, and the information reflecting the physical state may be directly transmitted from the sensing device 10 to the individual identification apparatus 30. For example, the marker 150 of the deformation detection bolt 100 is read by the individual identification apparatus 30 to acquire the identifier, and the information transmission instruction signal to which only the sensing device 10 of the identifier responds is transmitted from the apparatus communicator 40 of the individual identification apparatus 30. The sensing device 10 transmits the information reflecting the physical state acquired by the information acquirer 16 when receiving the information transmission instruction signal of the identifier of sensing device 10. The individual identification apparatus may be configured to display a screen showing the received information reflecting the physical state on the display 36.

The invention claimed is:

1. An individual identification system comprising:
    at least one sensing device including an identifier, and an individual identification apparatus configured to perform individual identification of the at least one sensing device,
    wherein the at least one sensing device comprises a visible portion visually recognizable from an outside, the individual identification apparatus comprising an image identification means operable to identify the visible portion of the at least one sensing device as image information, and
    wherein display content of the visible portion is read and the identifier is acquired by the image identification means, the display content including information measured by the at least one sensing device; and
    a display device configured to receive the display content of the visible portion from the image identification means and display the information measured by the at least one sensing device over a location of the visible portion in the display.

2. The individual identification system of claim 1, wherein the visible portion is still image information including at least one of a character, a symbol, a geometric pattern, a color image, a character image, a bar code, a two-dimensional bar code, and a color bar code.

3. The individual identification system of claim 2, wherein the visible portion is configured to include a light emitting device.

4. The individual identification system of claim 3, wherein the display content of the visible portion changes with time.

5. The individual identification system of claim 4, wherein the at least one sensing device comprises a receiver configured to receive a signal from the outside.

6. The individual identification system of claim 5, wherein the visible portion is configured such that unique display content is visually recognizable after receiving the signal from the outside.

7. The individual identification system of claim 6, wherein the visible portion has a unique display linked with the identifier.

8. The individual identification system of claim 7, wherein
    the individual identification apparatus is cooperated with an image output portion, and
    the individual identification apparatus displays and outputs acquisition information of the device according to the identifier identified by the image identification means as an extended reality to the image output portion.

9. The individual identification system of claim 3, wherein the light emitting means is capable of emitting one or more of infrared rays, visible rays, and ultraviolet rays.

10. The individual identification system of claim 1, wherein the visible portion is configured to include a light emitting device.

11. The individual identification system of claim 10, wherein the light emitting means is capable of emitting one or more of infrared rays, visible rays, and ultraviolet rays.

12. The individual identification system of claim 1, wherein the display content of the visible portion changes with time.

13. The individual identification system of claim 1, wherein the at least one sensing device comprises a receiver configured to receive a signal from the outside.

14. The individual identification system of claim 13, wherein the visible portion is configured such that unique display content is visually recognizable after receiving the signal from the outside.

15. The individual identification system of claim 1, wherein the visible portion has a unique display linked with the identifier.

16. The individual identification system of claim 1, wherein the individual identification apparatus is cooperated with an image output portion, and the individual identification apparatus displays and outputs the information measured by the at least one sensing device according to the identifier identified by the image identification means as an extended reality to the image output portion.

17. The individual identification system of claim 16, wherein the device comprises:

an information acquirer configured to acquire the information measured by the at least one sensing device reflecting a physical state of the at least one sensing device and/or surroundings of the at least one sensing device; and a transmitter configured to transmit the information measured by the at least one sensing device reflecting a physical state acquired by the information acquirer to the outside.

18. The individual identification system of claim 17, further comprising:

a server configured to receive the information measured by the at least one sensing device reflecting the physical state from the at least one sensing device and store the information, wherein the server is configured to transmit the information measured by the at least one sensing device reflecting the physical state stored in the server to the individual identification apparatus in response to a request from the individual identification apparatus.

\* \* \* \* \*